Figure 1:
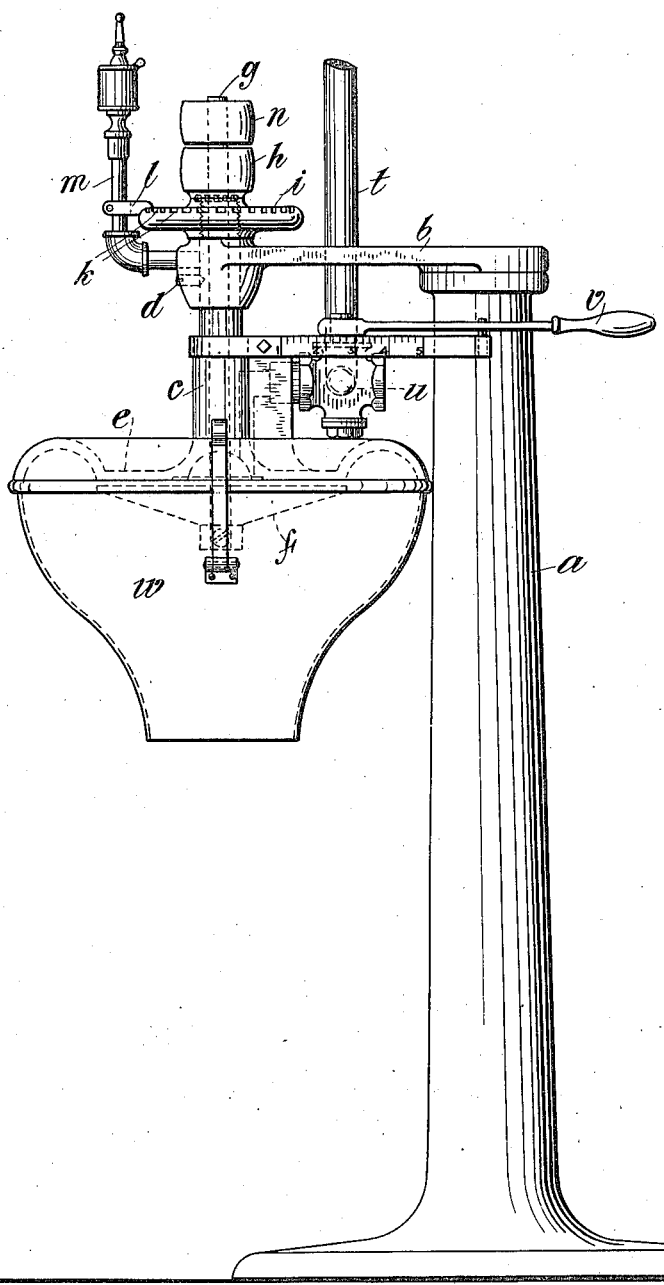

A. FORNANDER.
APPARATUS FOR TREATING MILK AND OTHER LIQUIDS.
APPLICATION FILED MAR. 10, 1910.

1,013,594.

Patented Jan. 2, 1912.

2 SHEETS—SHEET 1.

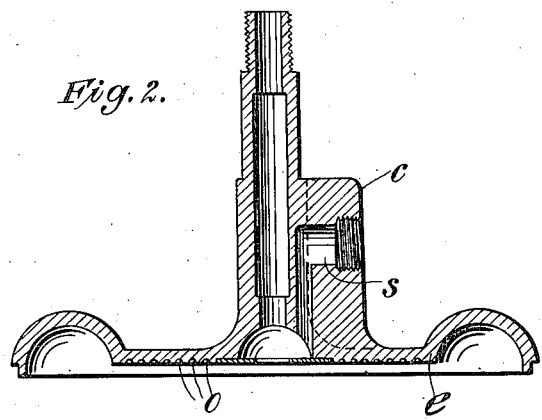
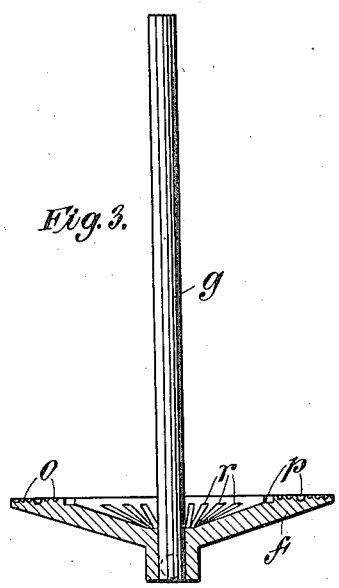
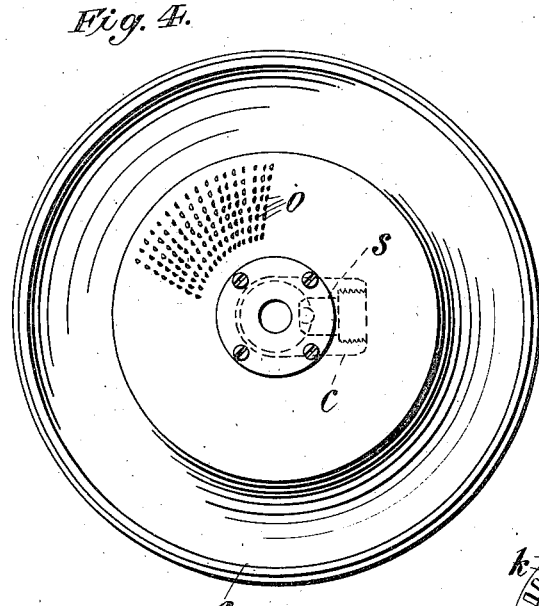
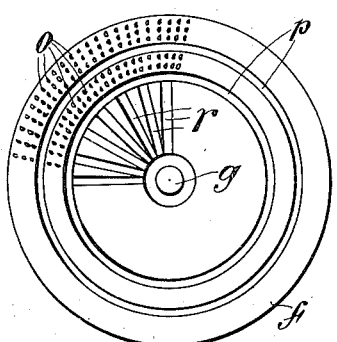
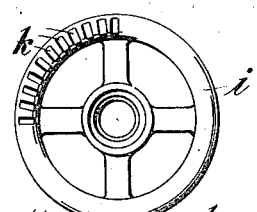

UNITED STATES PATENT OFFICE.

ALFRED FORNANDER, OF NEW YORK, N. Y., ASSIGNOR TO DAIRY OILS EXTRACTING COMPANY, OF NEW YORK, N. Y., A CORPORATION OF NEW YORK.

APPARATUS FOR TREATING MILK AND OTHER LIQUIDS.

1,013,594.   Specification of Letters Patent.   Patented Jan. 2, 1912.

Application filed March 10, 1910. Serial No. 548,445.

*To all whom it may concern:*

Be it known that I, ALFRED FORNANDER, a citizen of the United States, and a resident of the borough of Manhattan of the city of New York, in the county and State of New York, have invented certain new and useful Improvements in Apparatus for Treating Milk and other Liquids, of which the following is a specification, reference being had to the accompanying drawings, forming a part hereof.

The invention relates more particularly to improvements in machines of the type shown and described in Letters Patent of the United States, No. 917,008, dated April 6, 1909, in which type of machine the milk or other liquid to be treated is fed between two disks with opposed roughened faces separated by a very small space and which are adapted to rotate at a high speed in opposite directions or at least to have considerable relative movement with respect to each other. I have discovered that the distance between the faces of the disks has considerable to do with the effect produced upon the milk or other liquid introduced into the machine, so that by varying this distance within certain limits, I am enabled to get different results. I find, for instance, that with the faces of the disks exceedingly near together, say about one two-thousandths of an inch apart, I can produce an emulsion of the milk or cream which is run through a machine of the type in question; and that by moving the disks slightly farther apart, the emulsification ceases although a certain sterilizing effect is produced upon the milk.

One of the objects of the invention, accordingly, is to provide a mechanism of the type in question in which the faces of the disks may be accurately and readily adjusted with respect to each other.

Another object of the invention is to provide means for maintaining the disks in their adjusted relation with respect to each other. In the use of these machines, it has developed that the partial vacuum produced between the disks by centrifugal action tends to draw the faces of the disks (which are separated by an exceedingly thin space) into contact with each other and thus to interfere considerably with the smooth and proper running of the machine. To overcome this difficulty the faces of the disks, or at least one of the disks, are formed so as to permit the milk to feed down as freely as possible into the space between the disks and thus minimize the tendency to the formation of a vacuum.

In the drawings, where a convenient and practical embodiment of the invention is illustrated, Figure 1 is a view thereof in elevation. Figs. 2 and 3 are detail views in section, upon an enlarged scale, of the disk members. Figs. 4 and 5 are plan views of the faces of said disk members respectively, and, Figs. 6 and 7 are detail views of a hand wheel forming a portion of the adjusting mechanism for one of the disks.

The apparatus illustrated in the drawing is supported upon a column $a$ through the medium of a bracket $b$, the end of the latter receiving the upper end of the casting or disk forming member $c$ which is retained or held therein by a set screw $d$ threaded in the end of the arm. The lower disk $f$ is secured to a driving shaft $g$ which, when the disks are assembled in operative position, passes up through the disk $e$ and member $c$, in which it has suitable bearings, and is supported by a driving pulley $h$ fast thereon and which is provided with suitable bearings for rotating against a hand wheel $i$. The latter is loosely threaded upon the upper end of the casting $c$, so that by moving the hand wheel one way or the other, the lower disk $f$ may be raised or lowered, as desired, through the medium of the pulley $h$ and the shaft $g$. The hand wheel is provided with notches $k$ in which a pawl $l$ is adapted to fit for the purpose, as will be understood, of retaining the parts in their adjusted position, the pawl being pivoted to an oil cup member $m$. Moreover, the shaft $g$ may be provided with an additional pulley $n$, fast thereto, so that the shaft may be driven by two motors arranged 180 degrees apart for the purpose of balancing the effect of the driving belts.

Referring now to the faces of the disks *e* and *f*, it will be seen that these faces are roughened, the roughening being indicated in a general way at *o* in Figs. 2 and 5 inclusive. This roughening may be formed by providing small recesses in the faces of the disks, said recesses preferably having sharp edges. These roughened surfaces act upon the liquid being treated, but, as was stated above, it has been found in practice that while these rough surfaces satisfactorily perform their functions upon the liquid being treated, some means must be provided in order to prevent the formation of a partial vacuum between the disks operating under the conditions specified. I have found that a satisfactory solution of this difficulty may be had in forming in one of the disks concentric grooves, as *p*, (Figs. 3 and 5) which are preferably continuous or circular as shown. This permits a certain quantity of liquid to collect therein and acts as a check to its too rapid discharge from the peripheries of the disks by the centrifugal action. Moreover, I have found also that by hollowing out the face of one of the disks at the center, as that of the lower disk *f*, and by having the sides of this hollow slope gradually toward the periphery of the disk, the action is much improved. It is preferable, also, to provide radial channels *r* within this hollow.

The milk or other liquid is fed into the space between the disks through an opening *s* in the casting *c* and is discharged into said space around the shaft *g*. The milk or other liquid is delivered through a tube *t* which is provided with a valve *u* and valve regulating means *v* in order that the quantity of the milk or other liquid delivered to the apparatus may be suitably controlled. The liquid is delivered from between the disks into a shell within which the lower disk rotates, and which shell comprises the upper disk *e* and a detachable hood *w* which is formed with a restricted end through which the liquid may be finally discharged into a suitable receiving pail.

It will be understood that various changes may be made in the embodiment of the improvements shown and described herein without departing from the spirit of the invention.

I claim as my invention:

1. In an apparatus for treating milk and other liquids, the combination of two disks mounted face to face, at least one of said disks having a groove in its face and at least one of the disks having roughened portions upon its face.

2. In an apparatus for treating milk and other liquids, the combination of two disks mounted face to face, one of said disks having a concentric groove and roughened portions in its face.

3. In an apparatus for treating milk and other liquids, the combination of two disks mounted face to face, and adapted to have movement relative to each other, one of said disks having a circular groove in its face.

4. In an apparatus for treating milk and other liquids, the combination of two disks each having a roughened face opposed to the other and one of said disks having a circular groove in its face.

5. In an apparatus for treating milk and other liquids, the combination of two disks mounted face to face, one of said disks being hollowed out at the center.

6. In an apparatus for treating milk and other liquids, the combination of two disks mounted face to face, one of said disks being formed with a central hollow having sides sloping toward the periphery, and said sides being provided with radial grooves.

7. An apparatus for treating milk and other liquids, the combination of two disks mounted face to face, at least one of said disks having depressed portions with sharp edges and at least one of said disks being hollowed out at its center.

8. In an apparatus for treating milk and other liquids, the combination of two disks each having a roughened face opposed to the other, one of said disks having a circular groove in its face, and one of said disks being mounted to rotate.

9. In an apparatus for treating milk and other liquids, the combination of two disks each having a roughened face opposed to the other, and one of said disks having a circular groove in its face and being mounted to rotate.

10. In an apparatus for treating milk and and other liquids, the combination of two disks mounted face to face, one of which is stationary, means to feed liquid through the central portion of the stationary disk to the space between the disks, and a driving shaft secured to the other of the disks and passing through the stationary disk.

11. In an apparatus for treating milk and other liquids, the combination of a shell, a disk formed in the upper part of the shell, a disk facing the first named disk revoluble relative to the first mentioned disk, a shaft secured to the second named disk and passing through the first named disk, and means to adjust the two disks with respect to each other.

12. In an apparatus for treating milk and other liquids, the combination of a shell consisting of a disk forming member at the top and a detachable hood below, a disk parallel to said member, said disk and member having roughened opposing faces, a circular groove in one of the faces, a shaft connected to one of the disks and passing through the other disk, and means to adjust the shaft longitudinally to regulate the distance between said member and disk.

13. In an apparatus for treating milk and other liquids, the combination of two disks each having a roughened face opposed to the other, and one of said disks having two circular grooves formed in its face, and a shaft for driving it.

This specification signed and witnessed this 29th day of January, A. D., 1910.

ALFRED FORNANDER.

Signed in the presence of—
 LUCIUS E. VARNEY,
 G. MCGRANN.